(12) United States Patent
Johnson et al.

(10) Patent No.: US 10,224,779 B2
(45) Date of Patent: Mar. 5, 2019

(54) ELECTRIC MACHINE, BARRIER AND ASSOCIATED KIT

(71) Applicant: Regal Beloit America, Inc., Beloit, WI (US)

(72) Inventors: Philip Wayne Johnson, Bluffton, IN (US); Joshua James Westhoff, Fort Wayne, IN (US); Michael Allen Marks, Tipp City, OH (US)

(73) Assignee: Regal Beloit America, Inc., Beloit, WI (US)

( * ) Notice: Subject to any disclaimer, the term of this patent is extended or adjusted under 35 U.S.C. 154(b) by 456 days.

(21) Appl. No.: 14/504,777

(22) Filed: Oct. 2, 2014

(65) Prior Publication Data

US 2016/0099627 A1   Apr. 7, 2016

(51) Int. Cl.
| | |
|---|---|
| *H02K 5/22* | (2006.01) |
| *H02K 5/18* | (2006.01) |
| *H02K 11/00* | (2016.01) |
| *H02K 15/12* | (2006.01) |
| *H02K 11/33* | (2016.01) |

(52) U.S. Cl.
CPC .......... *H02K 5/18* (2013.01); *H02K 11/0073* (2013.01); *H02K 11/33* (2016.01); *H02K 15/12* (2013.01); *H02K 2213/03* (2013.01)

(58) Field of Classification Search
CPC .. H02K 5/00; H02K 5/15; H02K 5/22; H02K 5/225; H02K 5/1732; H02K 11/00; H02K 11/0073; H02K 11/04; H02K 11/21; H02K 11/23; H02K 11/25; H02K 11/33; H02K 29/06; H02K 5/12; H02K 29/08; F04D 13/08; F04D 13/0686; F04D 13/0693; F04D 29/02; F04D 29/40; F04D 29/60; F04D 29/605; F04D 29/62; F04B 17/03; F04C 2210/1044; F04C 2240/808
See application file for complete search history.

(56) References Cited

U.S. PATENT DOCUMENTS

| | | | |
|---|---|---|---|
| 5,315,194 A * | 5/1994 | Brusasco | H02K 23/66 310/64 |
| 6,916,210 B2 | 7/2005 | Moore, Jr. et al. | |
| 7,256,522 B2 * | 8/2007 | Johnson | H02K 5/1732 310/89 |
| 7,749,178 B2 | 7/2010 | Imboden et al. | |

(Continued)

FOREIGN PATENT DOCUMENTS

| | | |
|---|---|---|
| CA | 1073194 A1 | 3/1980 |
| CN | 101378718 A | 3/2009 |

(Continued)

*Primary Examiner* — Tran Nguyen
(74) *Attorney, Agent, or Firm* — John S. Wagley

(57) ABSTRACT

According to an embodiment of the invention, an electric machine is provided. The machine includes a support structure, a stator secured to the support structure, and a rotor rotatably secured to the support structure. The machine also includes a circuit board positioned at least partially within the support structure. The circuit board is adapted for controlling an electromagnetic field produced by the stator. The machine also includes a potting material in contact with a first surface of the circuit board and a barrier for at least partially containing the potting material.

17 Claims, 16 Drawing Sheets

(56) References Cited

U.S. PATENT DOCUMENTS

| | | | | |
|---|---|---|---|---|
| 2003/0173925 A1* | 9/2003 | Strobl | ............... | F02M 37/08 |
| | | | | 318/543 |
| 2006/0250037 A1 | 11/2006 | Kümmlee | | |
| 2010/0090635 A1* | 4/2010 | Andersen | ............. | F04D 29/628 |
| | | | | 318/490 |
| 2014/0099217 A1* | 4/2014 | McCormick | ........... | F04D 5/002 |
| | | | | 417/410.1 |

FOREIGN PATENT DOCUMENTS

| | | |
|---|---|---|
| EP | 2549514 A2 | 1/2013 |
| JP | 2000078797 A | 3/2000 |
| JP | 2010262802 A | 11/2010 |
| KR | 2011040576 A | 4/2011 |
| WO | 2013139435 A1 | 9/2013 |
| WO | 2014147072 A1 | 9/2014 |

* cited by examiner

ELECTRIC MACHINE, BARRIER AND ASSOCIATED KIT

BACKGROUND OF THE INVENTION

The embodiments described herein relate generally to an electric machine, and more specifically, to an electric machine having encapsulated electronic components.

An electric machine is typically in the form of an electric generator or an electric motor. The machine typically has a centrally located shaft that rotates relative to the machine. Electrical energy applied to coils within the machine initiates this relative motion which transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil. An electric current is directed through the coils which induces a magnetic field. It is the magnetic field that initiates this relative motion which transfers the power to the shaft.

Many modern electric machines include a control, for controlling the motor. The control may control the speed and direction of the motor by, for example, controlling the electrical energy going to the coils. The control typically includes a plurality of electrical components.

The electric machine typically includes housing for containing and supporting the stator. While the electrical components may be positioned in a separate control, spaced from the housing of the electric machine, typically, to reduce cost, to reduce space requirements or for other reasons, at least a portion of the electrical components are positioned within the electric machine housing.

Typically, to permit heat generated by the coils and by electrical components to exit the housing, the housing is vented. In many applications a fan may be positioned within the housing to provide for additional air flow to cool the electric machine components. The venting of the housing permits moisture to enter the housing from the environment. In certain applications, such as in air handlers used to cool building, the moisture level within the electric machine or motor housing may be quite high.

Some electrical components and electrical conduits are susceptible to harmful effects caused by high levels of moisture and such moisture may reduce component life. Some electrical machines are exposed to environments with high levels of moisture. Pumping applications, cooling towers and air conditioning chillers are among applications where a high level of moisture is present. To protect component from such moisture, some of the components may be encapsulated in an insulating material, for example a polymer, for example a curable epoxy. The epoxy is applied in a fluid form such that it fills by gravity a large portion of the housing cavity. The epoxy is expensive, making its use in such large quantities to add substantial cost to the motor. It would be desirable to provide encapsulating protection for components in motors while using less epoxy to do so.

The present invention is directed to alleviate at least some of these problems with the prior art.

BRIEF DESCRIPTION OF THE INVENTION

According to an embodiment of the invention, an electric machine is provided. The machine includes a support structure, a stator secured to the support structure, and a rotor rotatably secured to the support structure. The machine also includes a circuit board positioned at least partially within the support structure. The circuit board is adapted for controlling an electromagnetic field produced by the stator. The machine also includes a potting material in contact with a first surface of the circuit board and a barrier for at least partially containing the potting material.

According to an aspect of the present invention, the electric machine may further include a plug to be positioned at least partially within the barrier. The plug may be adapted to displace a portion of the potting material.

According to another aspect of the present invention, the electric machine may be provided wherein the support structure includes a housing and wherein the barrier is spaced from the housing According to another aspect of the present invention, the electric machine may be provided wherein the barrier includes a wall extending vertically away from the first surface of the circuit board.

According to another aspect of the present invention, the electric machine may be provided wherein the barrier includes a continuous wall extending vertically away from the first surface of the circuit board and adapted to contain potting material in the barrier when the potting material is in a fluid form.

According to another aspect of the present invention, the electric machine may be provided wherein the support structure includes a housing and wherein the circuit board is positioned in the housing.

According to another aspect of the present invention, the electric machine may be provided wherein the housing is skewed with respect to the circuit board.

According to another aspect of the present invention, the electric machine may include a second barrier for at least partially containing the potting material. The second barrier may be adjacent a second surface of the circuit board. The second surface may be opposed to the first surface of the circuit board.

According to a further aspect of the present invention, the electric machine may be provided wherein the potting material is in contact with the second surface of the circuit board.

According to a further aspect of the present invention, the electric machine may be provided wherein the second barrier includes a generally planar portion of the second bather. The generally planar portion may be adjacent the second surface of the circuit board.

According to another embodiment of the invention, a barrier for use in an electric machine having a support structure, stator and a rotor is provided. The barrier includes a wall adapted to be secured to a first surface of a circuit board.

According to a further aspect of the present invention, the barrier may be provided wherein the barrier includes a continuous wall adapted to extend vertically away from the first surface of the circuit board and adapted to contain potting material therein, when the potting material is in a fluid form.

According to a further aspect of the present invention, the hairier may be provided wherein the barrier includes a polymer.

According to a further aspect of the present invention, the barrier may be provided wherein the barrier is spaced from the support structure.

According to a further aspect of the present invention, the barrier may be provided wherein the barrier includes a first portion in the form of a continuous wall adapted to extend vertically away from the first surface of the circuit board and a second portion for at least partially containing the potting material. The second barrier may be to adjacent a second surface of the circuit board. The second surface is opposed to the first surface of the circuit board.

According to another embodiment of the invention, a kit for providing a common potted control to motors of different sizes is provided. The kit includes a first motor subassembly including a first housing, a first rotor rotatably secured to the first housing, and a first stator fixedly secured to the first housing. The kit also includes a second motor subassembly including a second housing, a second rotor rotatably secured to the second housing, and a second stator fixedly secured to the second housing. The second housing is substantially smaller than the first housing. The kit also includes a motor controller including a plurality of electric components mounted on a circuit board. At least one of the electric components submersed in a potting material contained at least partially by a bather extending from a surface of the circuit board and defining a barrier outer periphery. The motor controller adapted to selectively control the first motor subassembly and the second motor subassembly. The first motor subassembly and the motor controller are configurable to provide a first motor and the second motor subassembly and the motor controller are configurable to provide a second motor.

According to a further aspect of the present invention, the kit may be provided wherein the barrier outer periphery of the motor controller is spaced from the first housing and closely conforms to the second housing.

According to another aspect of the present invention, the kit may be provided wherein the kit further includes a control module operably associated with one of the first motor subassembly and the second motor subassembly for cooperation with the motor controller and the one of the first motor subassembly and the second motor subassembly.

According to a further aspect of the present invention, the kit may be provided wherein the kit further includes a second barrier for at least partially containing the potting material, the second barrier adjacent a second surface of the circuit board, the second surface opposed to the first surface of the circuit board.

According to another embodiment of the invention, a method for protecting electronic components in an electrical machine is provided. The method includes the steps of providing a housing, providing a stator, and securing the stator to the housing. The method also includes the steps of providing a rotor, rotatably securing the rotor to the housing, and providing a circuit board including electronic components mounted thereon. The method also includes the steps of providing a dam, positioning the dam on a surface of the circuit board and in a spaced apart relationship with the housing. The method also includes the steps of providing potting material and placing the potting material in the dam.

DETAILED DESCRIPTION OF THE INVENTION

The electric machine typically includes a housing for containing and supporting a stator which is excited by an electrical source that excites an electromagnetic field in coils in the stator. The coils interact with a rotor rotatably supported in the housing to provide the mechanical rotational energy for the electrical machine.

Many modern electric machines include a control, for controlling the motor. The control may control the speed and direction of the motor by, for example, controlling the electrical energy going to the coils. The control typically includes a plurality of electrical components.

The electric machine typically includes a housing for containing and supporting the stator. While the electrical components may be positioned in a separate control, spaced from the housing of the electric machine, typically, to reduce cost, to reduce space requirements or for other reasons, at least a portion of the electrical components are positioned within the electric machine housing.

Typically, to permit heat generated by the coils and by electrical components to exit the housing, the housing is vented. In many applications a fan may be positioned within the housing to provide for additional air flow to cool the electric machine components. The venting of the housing permits moisture to enter the housing from the environment. In certain applications, such as in air handlers used to cool building, the moisture level within the electric machine or motor housing may be quite high.

Some electrical components and electrical conduits are susceptible to these high levels of moisture and such moisture may reduce component life. To protect component from such moisture, some of the components may be encapsulated in an insulating material, for example a polymer, for example a curable epoxy. The epoxy is applied in a fluid form such that it fills by gravity a large portion of the housing cavity. The epoxy is expensive, making its use in such large quantities to add substantial cost to the motor.

Inexpensive and reliable encapsulating protection for components in motors while using less epoxy is desirable in the design and manufacture of such electric machines. The method, systems and apparatus described herein facilitate encapsulating protection for components in motors while using less epoxy in the electric motor. Designs and methods are provided herein to facilitate encapsulating protection for components in motors while using less epoxy in the electric motor.

Technical effects of the methods, systems, and apparatus described herein include at least one of reduced cost, improved serviceability, improved performance and quality and reduced labor costs.

Figure 1:
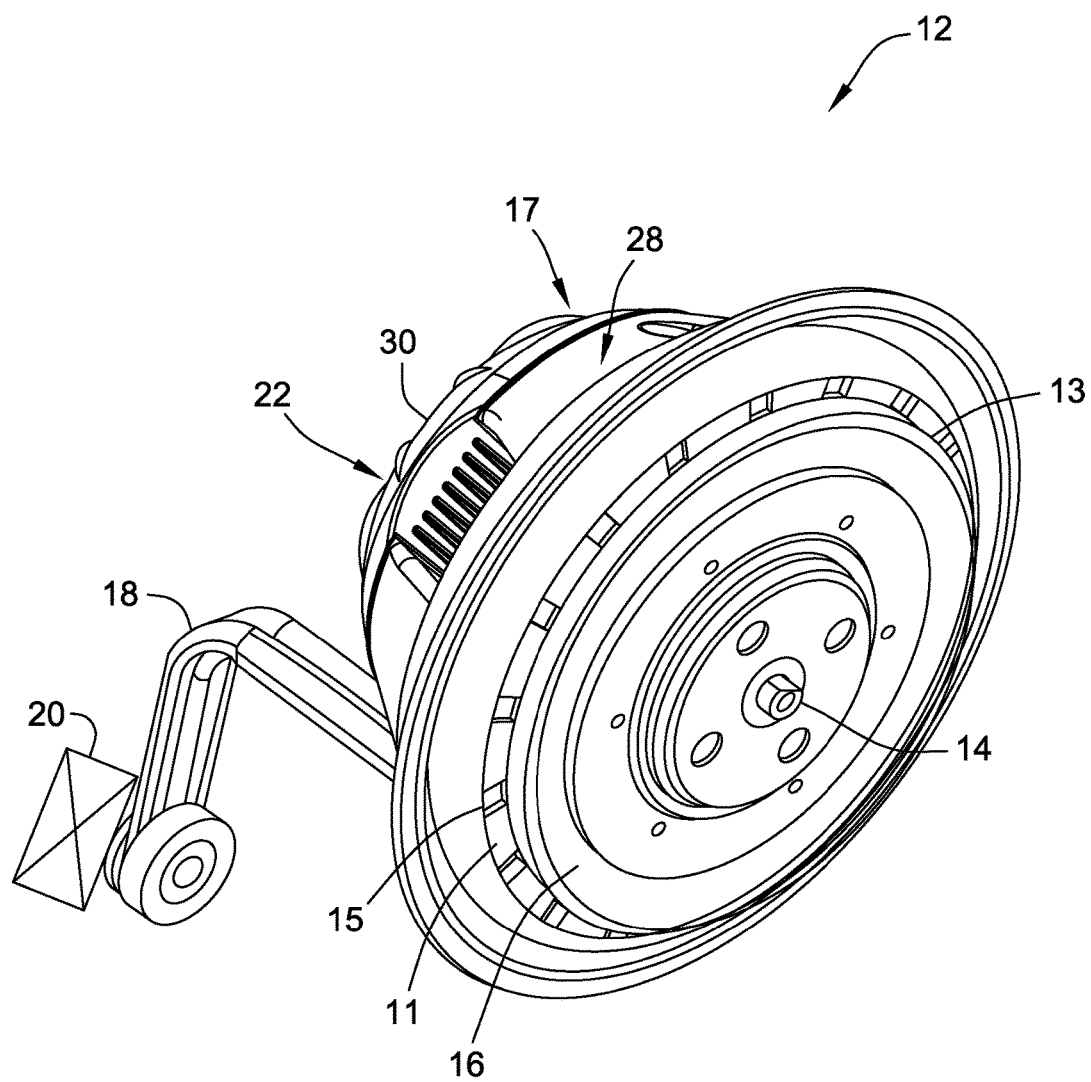
FIG. 1 is a perspective view of an embodiment of the present invention in the form of an electric machine.

According to an embodiment of the present invention and referring to FIG. 1, an electric machine 12 is provided. The electric machine 12 may be an electric motor or an electric generator, but hereinafter will be described as an electric motor 12. It should be appreciated that the electric motor may be used to power any mechanism, for example, a pump, a cyclic drive, a compressor, a vehicle, a fan or a blower.

The electric motor 12 typically includes a centrally located motor shaft 14 that rotates relative to the motor 12. Electrical energy applied to coils 15 within the motor 12. The coils generate an electromagnetic field that cooperates with an electromagnetic field in rotor 13 mounted to the motor shaft 14. The coils 15 initiate relative motion between the shaft 14 and the motor 12 that transfers the power from the coils to the shaft 14 and eventually to the motor load (not shown), It should be appreciated that the shaft 14 is not required if another connection between the rotor and the motor load is provided. The rotor may, alternatively, be rotatably mounted directly to motor housing 17, rather than rigidly to the shaft 14.

A stationary assembly 16, also referred to as a stator, includes stator core 11 and coils 15 or windings positioned around portions of the stator core. It is these coils to which energy is applied to initiate this relative motion which transfers the power to the shaft. These coils 15 are formed by winding wire (not shown), typically copper, aluminum or a combination thereof, about a central core to form the winding or coil. An electric current is directed through the coils 15 which induce a electromagnetic field. It is the magnetic field that initiates this relative motion which transfers the power to the shaft 14.

Typically the motor 12 includes a housing 17 having an inner wall or surface that defines a motor cavity therein. The housing 17 may include a plurality of components and may be made of a suitable durable material, for example a metal, a polymer or a composite.

It should be appreciated that the housing of the motor may have any suitable shape. As shown the housing has an aerodynamic shape for placement in an air flow region, for example in a fan.

The motor 12 may have any suitable size and shape and may be, for example, an induction motor, a permanent-split capacitor (PSC) motor, an electronically commutated motor (ECM) motor, or a switched reluctance motor. The housing 17 may include protrusions, for example fins (not shown), for dissipation of heat. The motor 12 may also include a fan (not shown) positioned within housing 17.

As shown in FIG. 1, the motor 12 may be used in any suitable application to rotate any mechanism. One such application is a fan, for example a furnace fan with a squirrel cage fan. Such a motor may be placed in the fluid flow and may, as shown have an aerodynamically shaped housing 17. The housing 17 may as shown be mounted in the air flow path by, for example arms 18 mounting to fan housing 20. While a single arm 18 may be used, as shown the housing 17 includes three spaced apart arm mounting pads 22, each for receiving an arm 18.

As shown in FIG. 1, the motor 12 further includes an electrical circuit 24 (see FIG. 2) for controlling an electromagnetic field produced by the stator 16. The electric circuit 24 may be considered a control of the motor 12. The electrical circuit 24 may be part of a control assembly or control module 26. The control module 26 may include a control module housing 28 that forms a portion of the housing 17. The control module housing 28 may include a cover or cap 30 for access to the electrical circuit 24.

Figure 2:
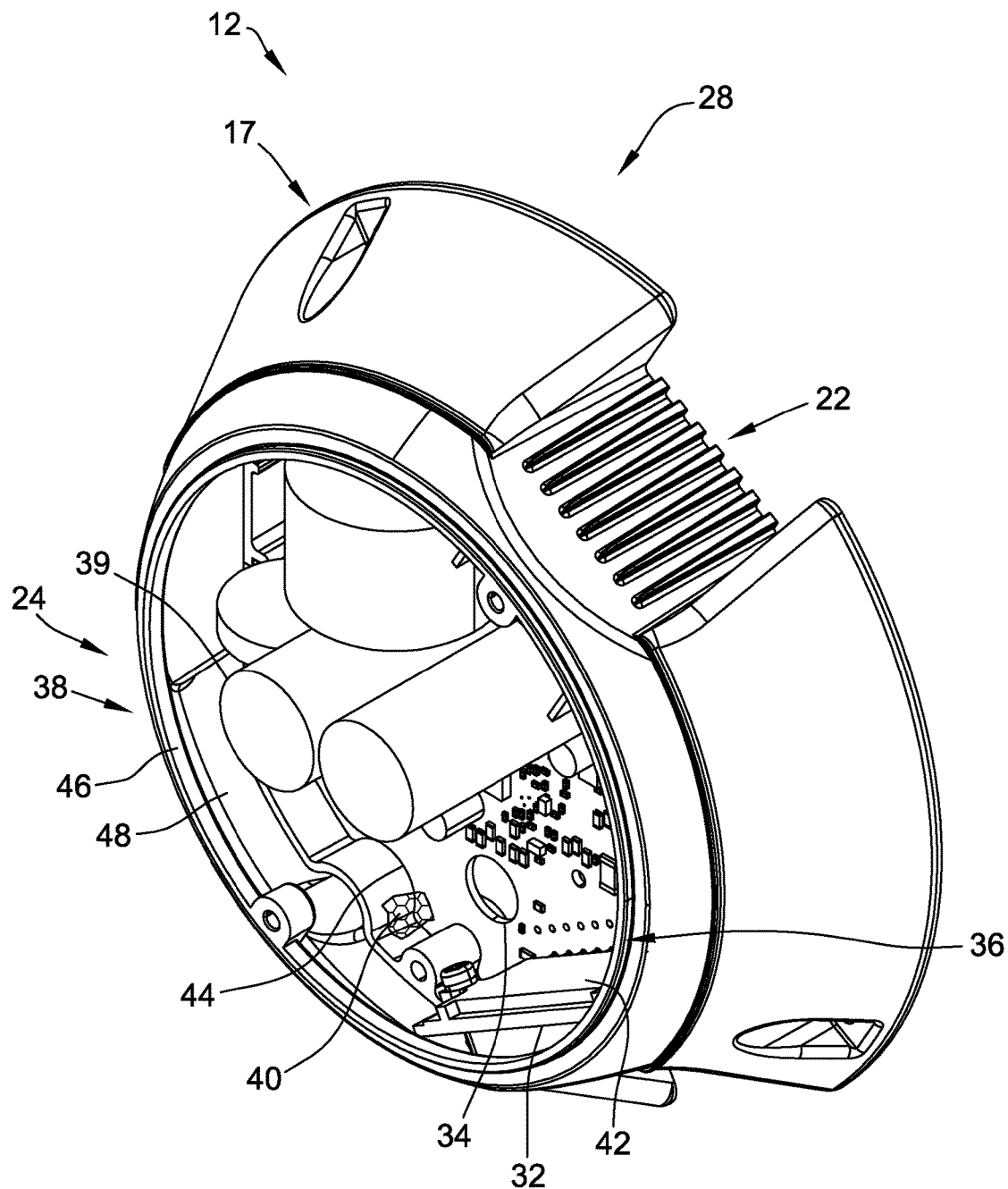
FIG. 2 is a perspective view of the control module of the electric machine of FIG. 1, showing the electrical circuit.
Figure 3:
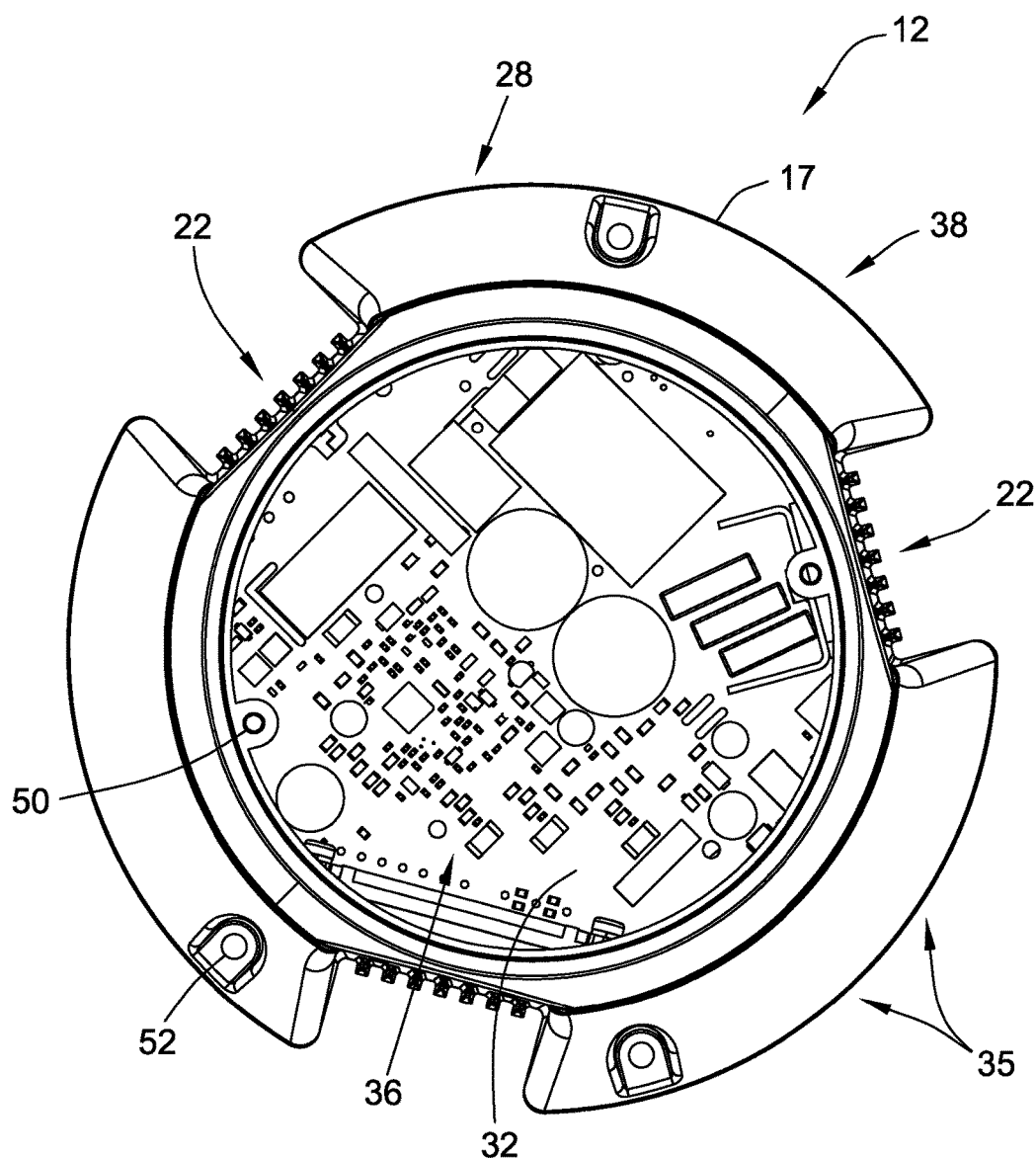
FIG. 3 is a front plan view of FIG. 2.
Figure 4:
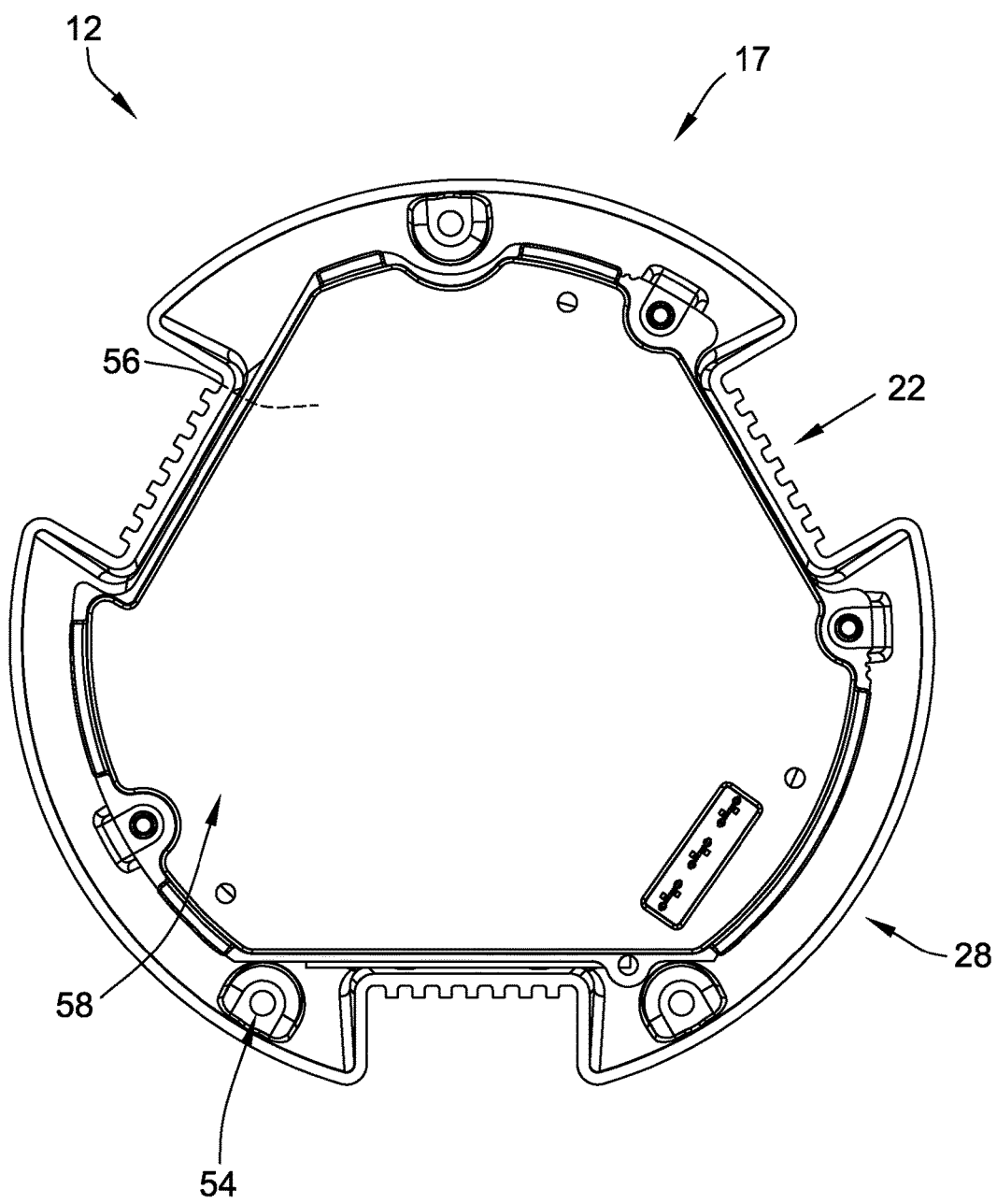
FIG. 4 is a back plan view of FIG. 2.

Referring now to FIGS. 2-4, the control module 26 is shown in greater detail with the cap 30 removed. The electric circuit 24 is, as shown in FIG. 2 mounted to circuit board 32. The circuit board 32 may have any suitable shape and may as shown closely conform to the control module housing 28. The circuit board may be made of a polymer and is preferably electrically insulative.

The electric circuit 24 typically includes electrical conduits 34 typically in the form of printed circuits. The electrical circuit 24 further typically includes electrical components 35 including small electrical components 36 such as resisters and integrated circuits and large electrical components 38 such as bulk capacitors 39.

Some electrical components 35, particularly the electrically conductive portions and electrical conduits 34 are susceptible to harmful effects caused by high levels of moisture and such moisture may reduce component life. Some electrical machines are exposed to environments with high levels of moisture. Pumping applications, cooling towers and air conditioning chillers are among applications where high levels of moisture are present. To protect components from such moisture and as shown in FIG. 2, portions of the electrical components 35 and electrical conduits 34 may be encapsulated in a insulating material, typically called a potting material 40. The potting material 40 may, for example, be a polymer, for example, a curable epoxy. As shown the potting material 40 is placed on first surface 42 of the circuit board 32. The potting material 40 is, when applied, typically in a fluid form, contained, at least partially, by the circuit board 32. The potting material in the fluid form flows to periphery 44 of the circuit board. The potting material 40 typically would have been contained by inner periphery 46 of the control module housing 28. However, having the potting material 40 contact the inner periphery 46 of the control module housing 28 would have several consequences. First, the circuit board 32 could not be removed from the control module housing 28, as the adherence of the potting material 40 to the inner periphery 46 of the control module housing 28, would prevent its removal. The inability to remove the circuit board 32 would make its repair very difficult and its replacement problematic. Second, added potting material would be required to fill the entire cross section of the control module 26, requiring the use of additional expensive potting material.

To eliminate the negative consequences mentioned above, the control module 26 further includes a first barrier 48 for containing the potting material 40 within that portion of the circuit board that needs to be potted to protect the portions of the components 36 and 38 and the electrical conduits 34. The barrier 48 may have any shape and be made of any suitable, durable material capable of containing the potting material 40. The barrier 48 may have a uniform thickness, as shown, or may have a varying thickness to provide additional strength in certain positions as needed. Referring now to FIG. 3, the control modules may have cap mounting features 50 in the form of openings for receiving fasteners (not shown) and control module mounting features 52 in the form of openings for receiving fasteners (not shown).

Referring now to FIG. 4, the control modules may further have circuit board mounting features in the form of openings 54 for receiving fasteners (not shown).

While it should be appreciated the circuit board 32 generally contains the porting material 40 on the first side 42 of the circuit board 32, portions of the potting material 40 may pass through the board 32 by openings (not shown) to which electrical components 35 are mounted. To seal second side 56 of circuit board 32, a second barrier 58 is positioned adjacent second surface 56.

The second barrier 58 may have any suitable shape and may be made of any suitable durable material. As shown in FIG. 4 the second barrier 58 may be in the form of a planar plate and have a shape similar to the circuit board 32. The second barrier 58 may be considered a backing plate 58. The second barrier may be made of a polymer and may be molded.

Referring now to FIGS. 5-8, the circuit board 32 may be combined with several other components of the control module 26 of FIGS. 2-4 to form circuit board assembly 60. The use of the circuit board assembly 60 permits the removal, service, repair, replacement of the circuit board assembly 60 from the control module 26.

Figure 5:
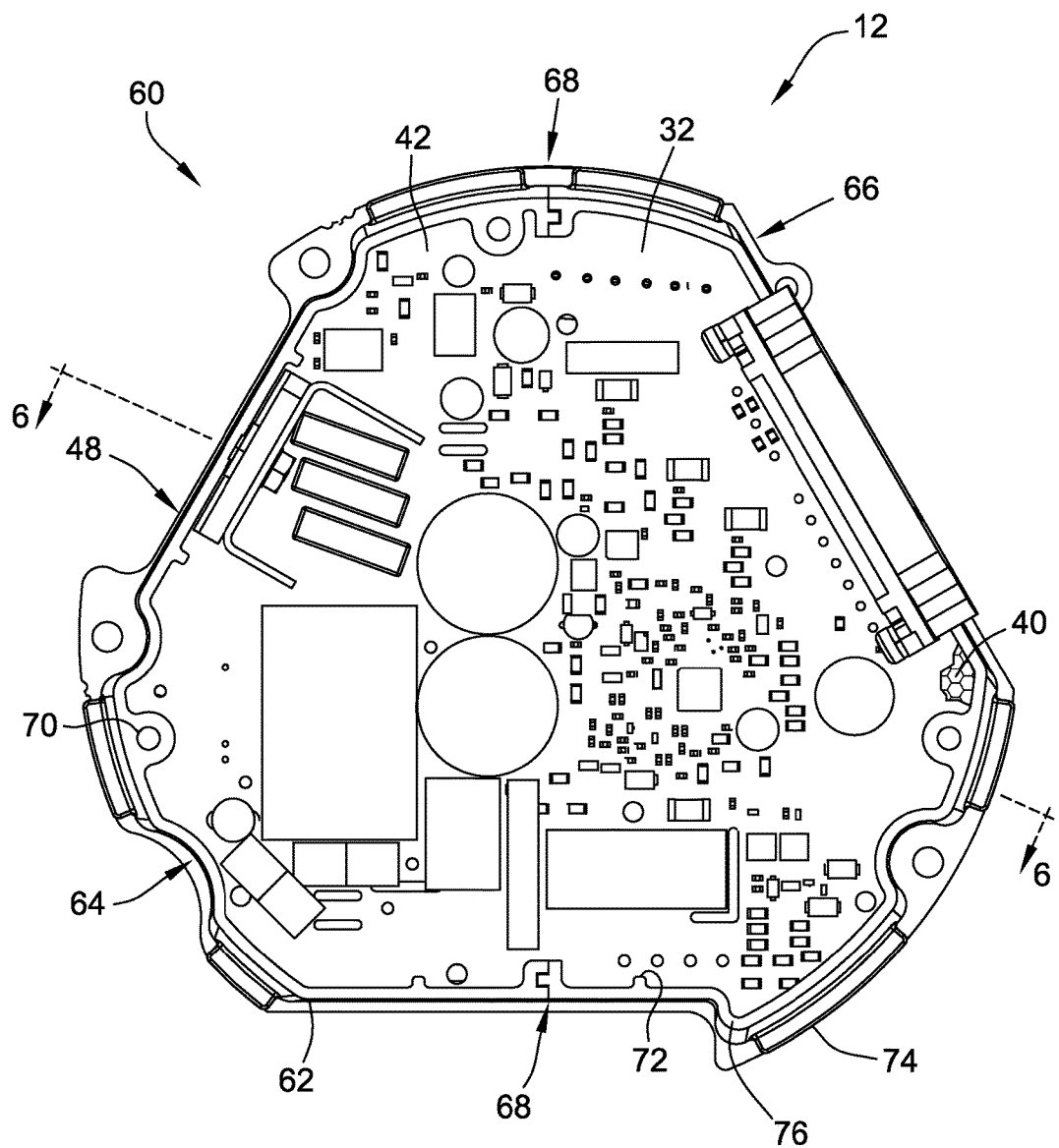
FIG. 5 is a plan view of a circuit board assembly with a potting barrier for use in the electric machine of FIG. 1 according to another embodiment of the present invention.

As shown in FIG. 5, the circuit board assembly 60 includes the circuit board 32, the electrical components 35, the electrical conduits 34, the first barrier 48 and the potting compound 40.

The first barrier 48, for simplicity and as shown in FIG. 5, is in the form of a vertical wall 62 extending upwardly from first surface 42 of circuit board 32. The circuit board 32 forms a portion of the barrier for the potting compound 40. The first barrier 48 may be called a potting cup, as the wall 62 and the board 32 form a cup to contain the potting material 40.

The potting cup 48 may be integral or, as shown, the cup 48 may include a first cup portion 64 and a second cup portion 66. The cup portions may be connected to each other by cup connections 68 on their respective ends. The cup connections 68 may be in the form of tongue and groove connections as shown. The potting cup 48 may include connecting features 70 in the form of openings for cooperation with fasteners (not shown) to secure the cup 48 to the board 32. Alternatively, the cup may be secured to the board by adhesives or by the potting material after it has cured. The cup 48 may further include ribs 72 for adding rigidity to the cup 48.

The cup 48 may be molded from a polymer. Alternatively, the cup 48 may include connectors (not shown) or wire retention features (not shown) which may be separate components or be integrally molded into the cup 48. The cup 48 may hold the circuit board during potting and may provide support for the magnet wire connections (not shown). The cup 48 may include outwardly extending tabs 74 extending outwardly from periphery 76 of the cup 48.

Figure 6:
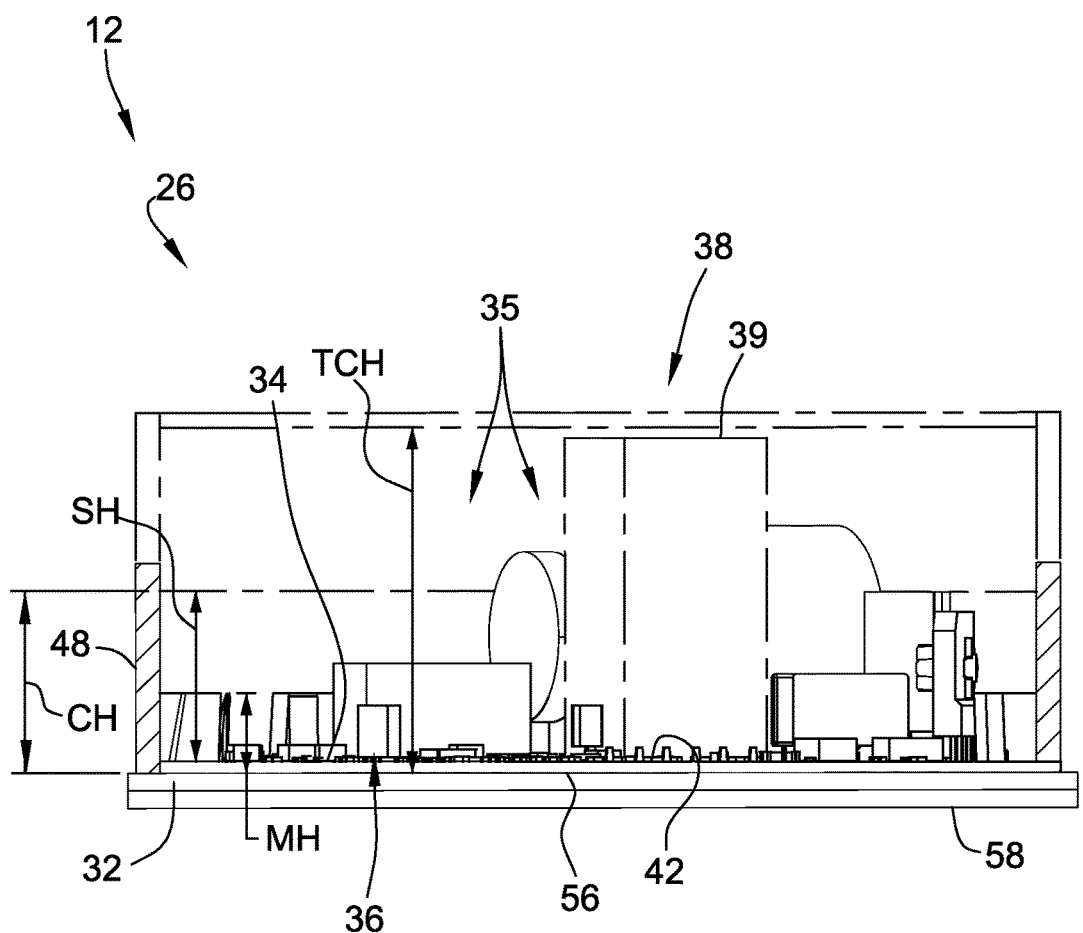
FIG. 6 is a cross sectional view of FIG. 5 along the lines 6-6 in the direction of the arrows.

Referring now to FIG. 6, the potting material 40 is shown in the cup 48. The potting material 40 is an insulator and serves to protect conductive components from damage due to a number of moisture related problems. The potting material should cover the electrical conduits 34 and the external conductive portions of the electrical components 35. Not all of the electrical components 35 must be fully encapsulated with the potting material 40.

In large countries, governmental and quasigovernmental organizations provide standards for the use of such potting materials and minimum thickness of such materials on components. Underwriters Laboratories [UL] Corporate Headquarters U.S.A., 333 Pfingsten Road, Northbrook, Ill. 60062-2096 is one such organization. Similar organizations exist throughout the world to provide guidance for and approval of electrical circuitry layouts including guidance on the use of potting material and potting covering of electrical circuits. Such minimum thicknesses of such materials on electrical components are governed by factors including minimum board level creepage clearances and air voltage/Ground clearance.

UL standards require a two (2) mm minimum potting material minimal height MH over electrical conduits 34. So the potting material should have a minimal cover of two (2) mm MH. To provide for a margin of safety and to accommodate manufacturing process variations, the potting material may have a safe height SIT over electrical conduits 34 of say at least greater than two (2) mm or from three (3) mm to ten (10) mm. The cup 48 may, as shown, have a cup height CH of around twelve (12) mm to permit coverage to the safe height SH. The cup 48 may be designed to have a total cup height TCH of around thirty (30) mm to permit encapsulation of all electrical components 35. This higher cup and resultant increase use of potting material may add sufficient cost and may not provide substantial reliability benefit.

Figure 7:
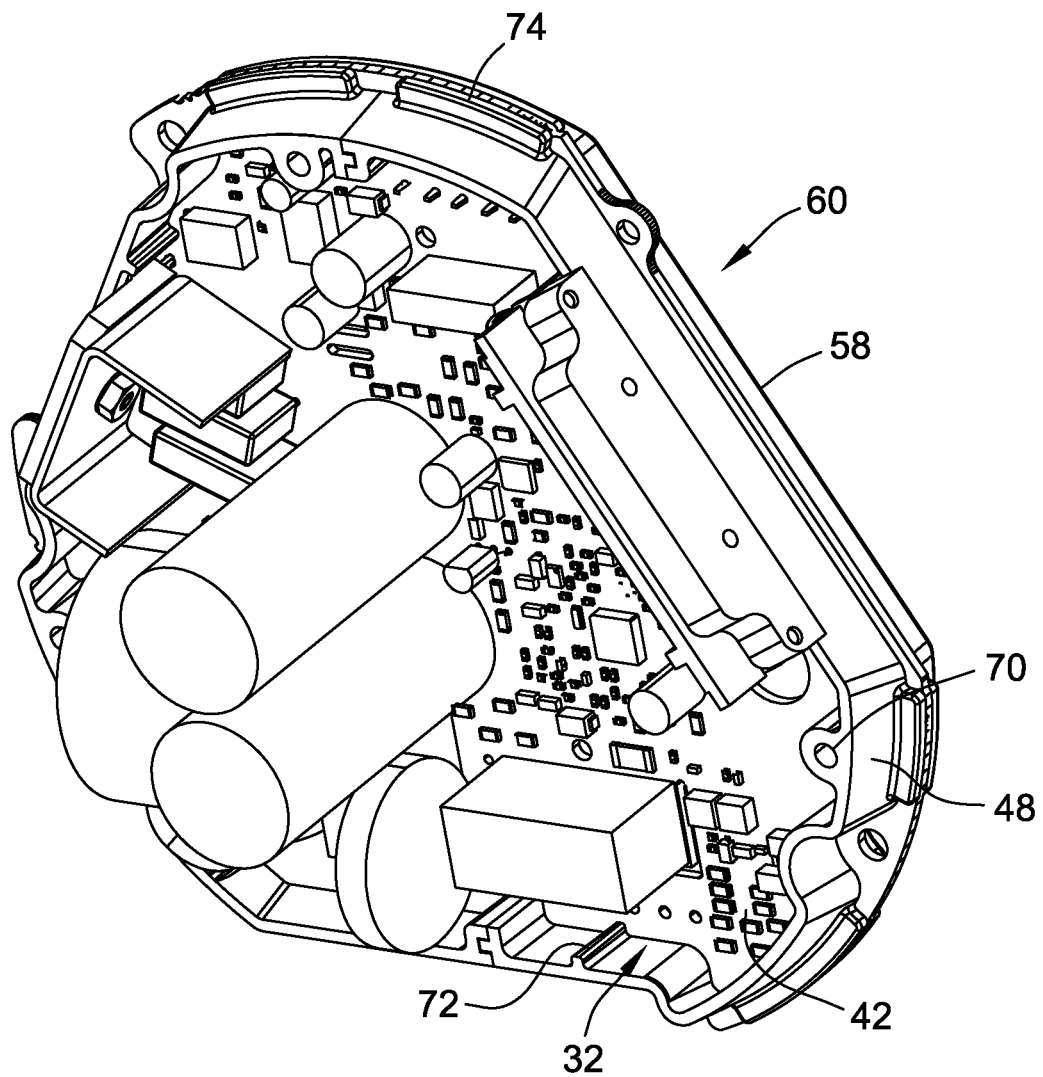
FIG. 7 is perspective plan view of the circuit board assembly of FIG. 5.
Figure 8:
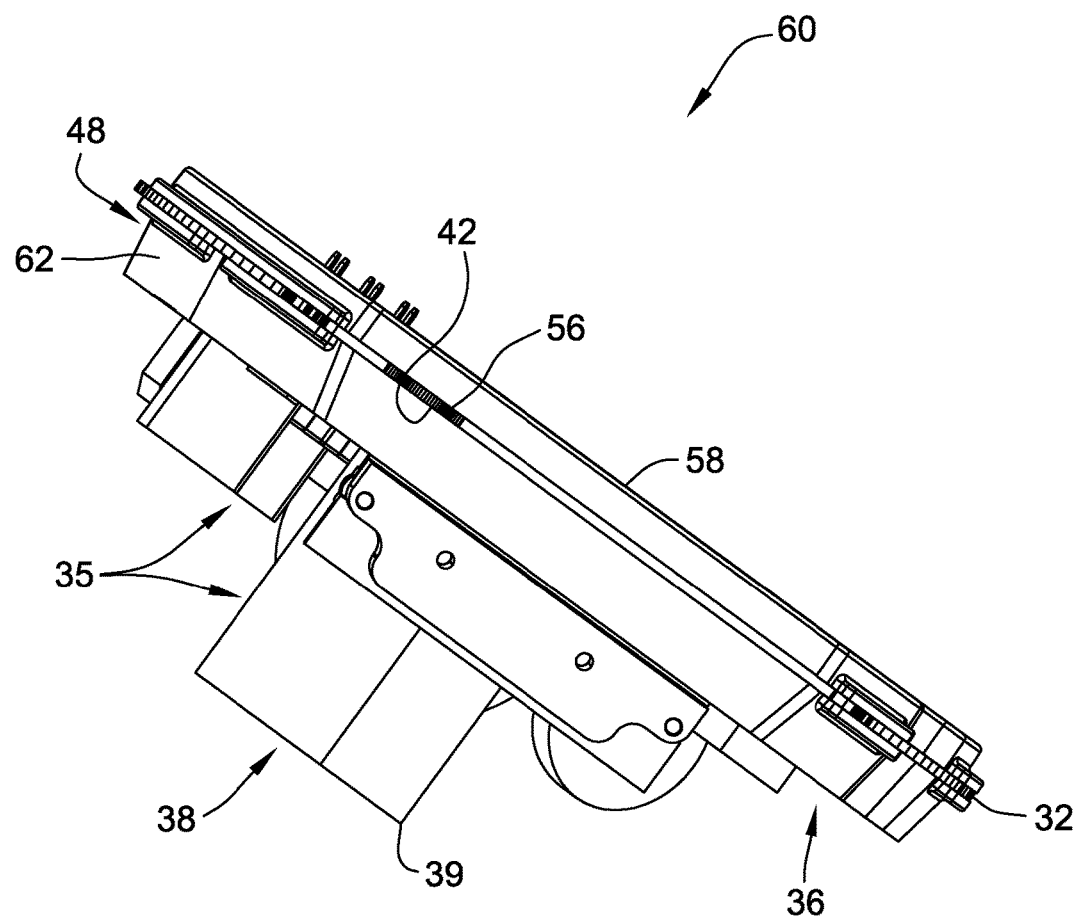
FIG. 8 is a side view of the circuit board assembly of FIG. 5.

Referring now to FIGS. 7-8, the backing plate 58 extends from second surface 56 of circuit board 32. The backing plate 58 may have a uniform thickness. The backing plate may be rigid as shown, or may be thin and flexible. If thin and flexible a temporary backing plate (not shown) may be positioned external to the backing plate to provide additional support when the potting material 40 is added and cured. The thin flexible backing plate may be a thin polymer film.

Figure 9:
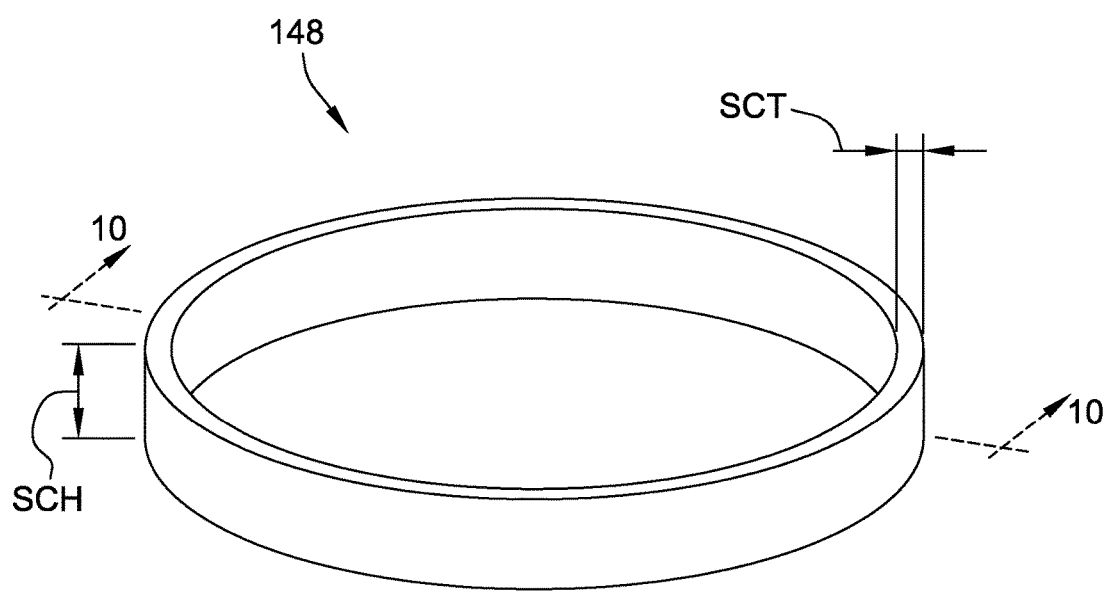
FIG. 9 is a perspective view of a potting barrier according to another embodiment of the present invention.
Figure 10:
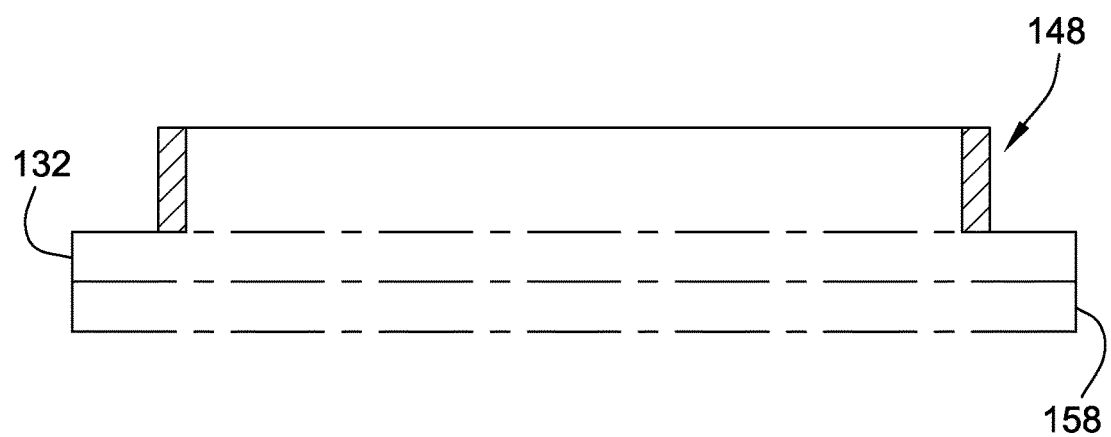
FIG. 10 is a cross sectional view of FIG. 9 along the lines 10-10 in the direction of the arrows.

Referring now to FIGS. 9 and 10, another embodiment of the present invention is shown as barrier or potting cup 148. The cup 148 is similar to cup 48 of FIGS. 1-8 except cup 148 has a much simpler hoop shape. The cup 148 has a height SCH and a thickness SCT. The cup 148 may be positioned on round circuit board 132 (shown in FIG. 10 in phantom). A round backing plate 158 (shown in FIG. 10 in phantom) may be placed on the opposite side of the circuit board 132.

Figure 11:
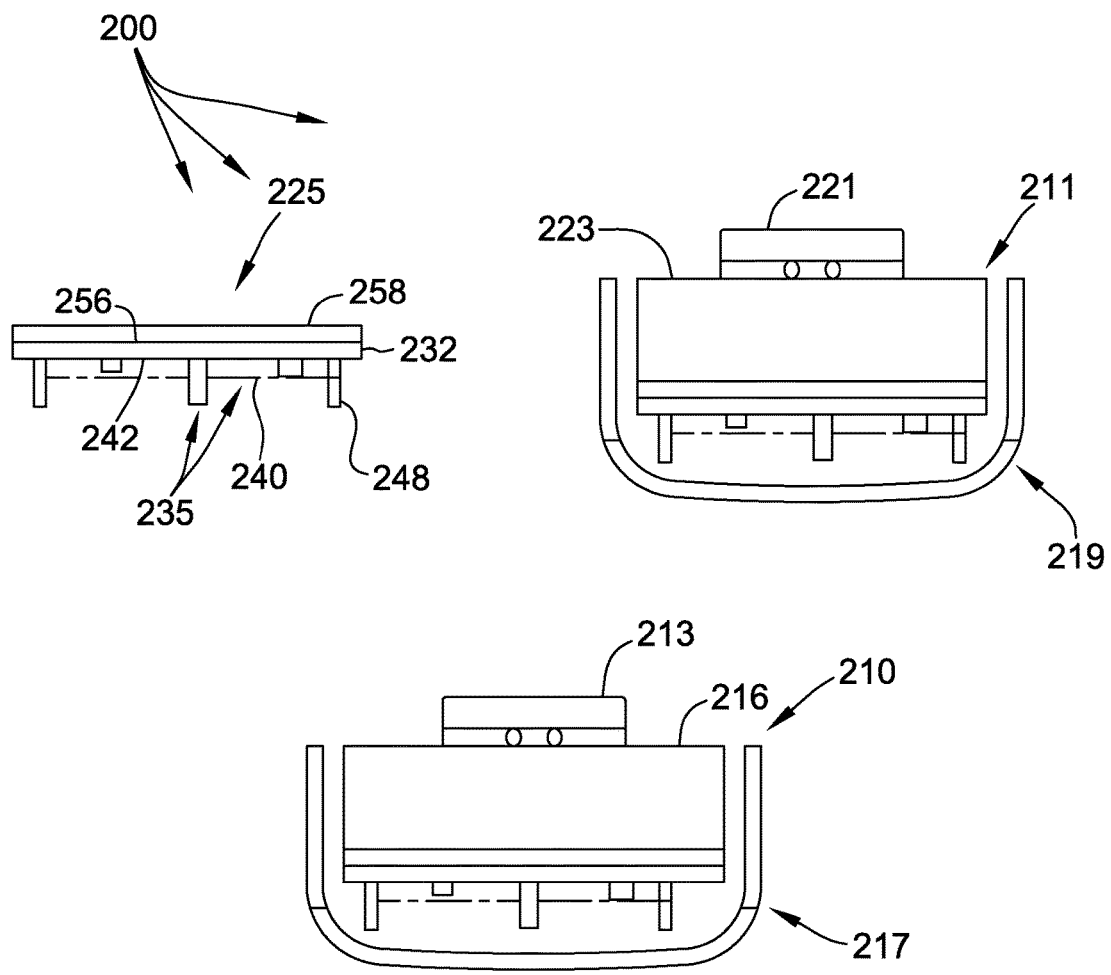
FIG. 11 is a plan view of a kit for providing a plurality of electrical machines according to another embodiment of the present invention.
Figure 12:
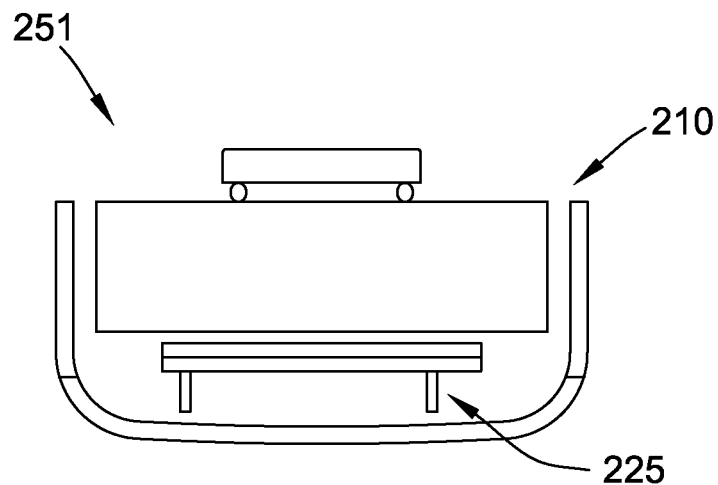
FIG. 12 is an end view of a first electrical machine with a first housing utilizing the kit of FIG. 11.
Figure 13:
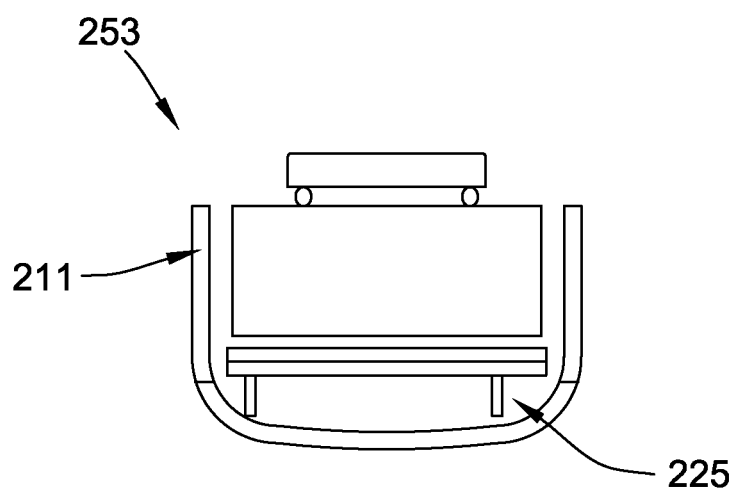
FIG. 13 is an end view of a second electrical machine with a second housing, smaller than the first housing, and utilizing the kit of FIG. 11.

Referring now to FIGS. 11-13, another embodiment of the present invention is shown as kit 200. The kit 200 provides a common potted control to motors of different sizes.

As shown in FIG. 11, the kit 200 includes a first motor subassembly 210 including a first housing 217, a first rotor 213 rotatably secured to the first housing 217, and a first stator 216 fixedly secured to the first housing 217. The kit also includes a second motor subassembly 211 including a second housing 219, a second rotor 221 rotatably secured to the second housing 219, and a second stator 223 fixedly secured to the second housing 219. The second housing 219 is substantially smaller than the first housing 217.

The kit 200 also includes a motor controller 225 including a plurality of electric components 235 mounted on a circuit board 232. At least one of the electric components 235 is submersed in a potting material 240 contained at least partially by a barrier 248 extending from a surface of the circuit board 232 and defining a barrier outer periphery 249.

As shown in FIG. 12, the first motor subassembly 210 and the motor controller 225 are configurable to provide a first motor 251.

As shown in FIG. 13, the second motor subassembly 211 and the motor controller 225 are configurable to provide a second motor 253. The motor controller 225 is adapted to selectively control the first motor subassembly 210 and the second motor subassembly 211.

As shown in FIGS. 11-13, the motor controller 225 may be in the form of a circuit board assembly similar to circuit board assembly 60 of FIGS. 5-8.

It should be appreciated that the motor controller 225 may, alternately, be in the form of a control module similar to control module 26 of FIGS. 2-4.

As shown in FIGS. 11-13, the kit 200 may be provided wherein the barrier outer periphery 249 of barrier or cup 248 of the motor controller 225 is spaced from the first housing 217 and closely conforms to the second housing 219.

As shown in FIGS. 11-13, the kit 200 may further include a control module similar to module 26 of FIGS. 5-8 and operably associated with one of the first motor subassembly 210 and the second motor subassembly 211 for cooperation with the motor controller 225 and the one of the first motor subassembly 210 and the second motor subassembly 211.

According to a further aspect of the present invention, the kit may be provided wherein the kit further includes a second barrier or backing plate 258, similar to backing plate 58 of FIGS. 1-9, for at least partially containing the potting material 240. The backing plate 258 may be positioned adjacent a second surface 256 of the circuit board 232. The second surface 256 is opposed to the first surface 242 of the circuit board 232.

Figure 14:
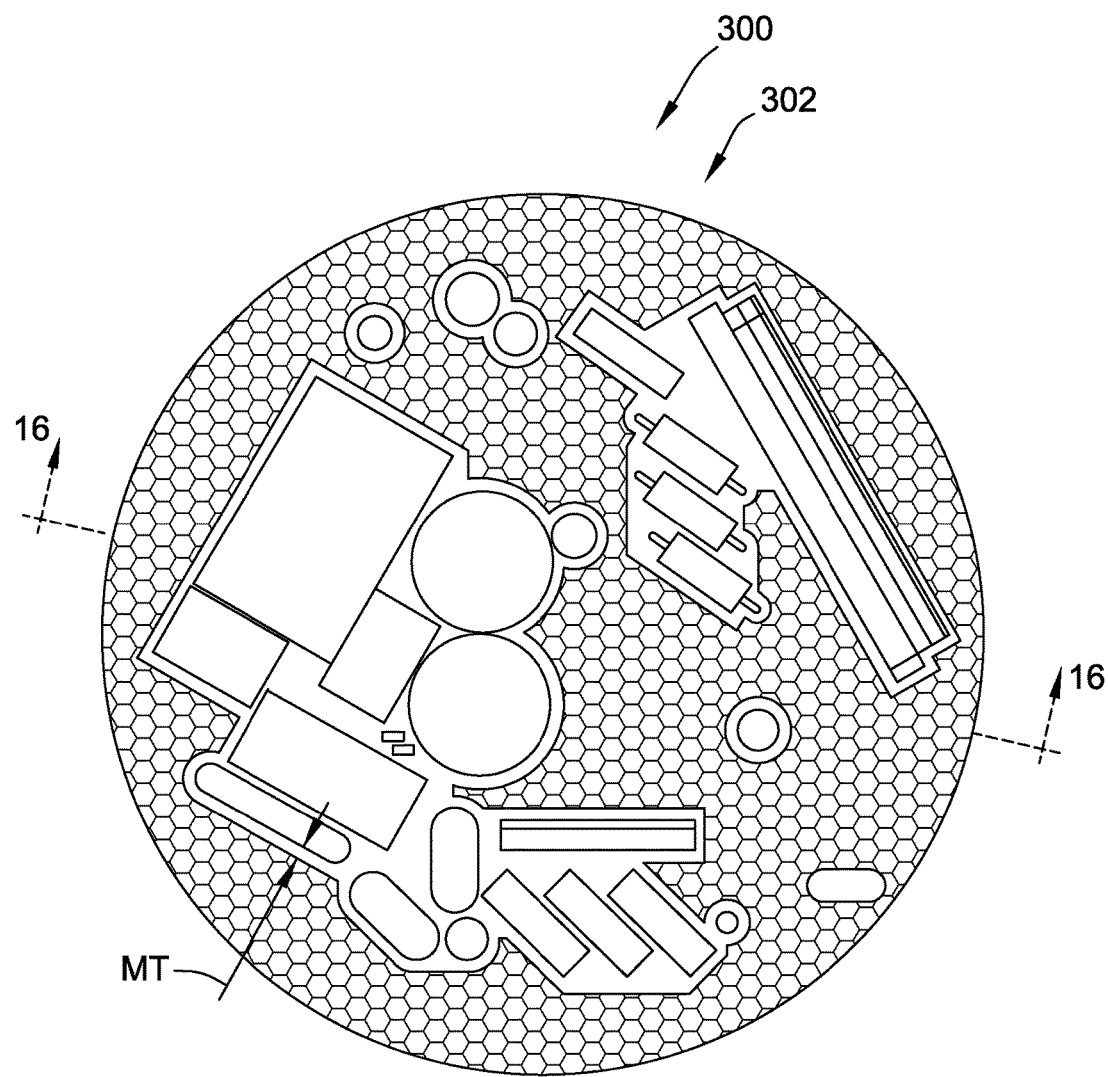
FIG. 14 is a plan view of a potting plug for use with the electric machine of FIG. 1, according to another embodiment of the present invention.
Figure 15:
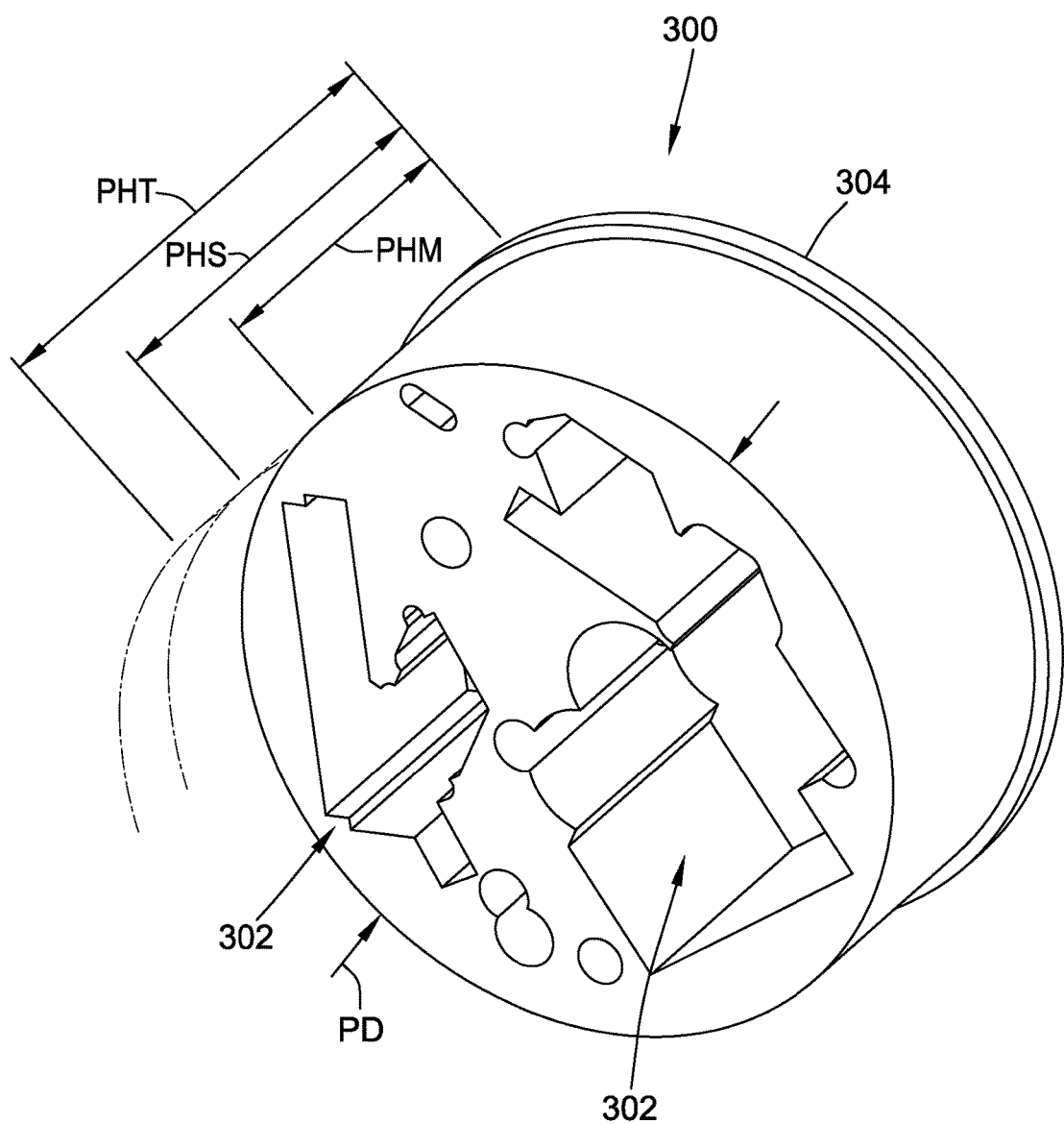
FIG. 15 is a perspective view of the potting plug of FIG. 14.
Figure 16:
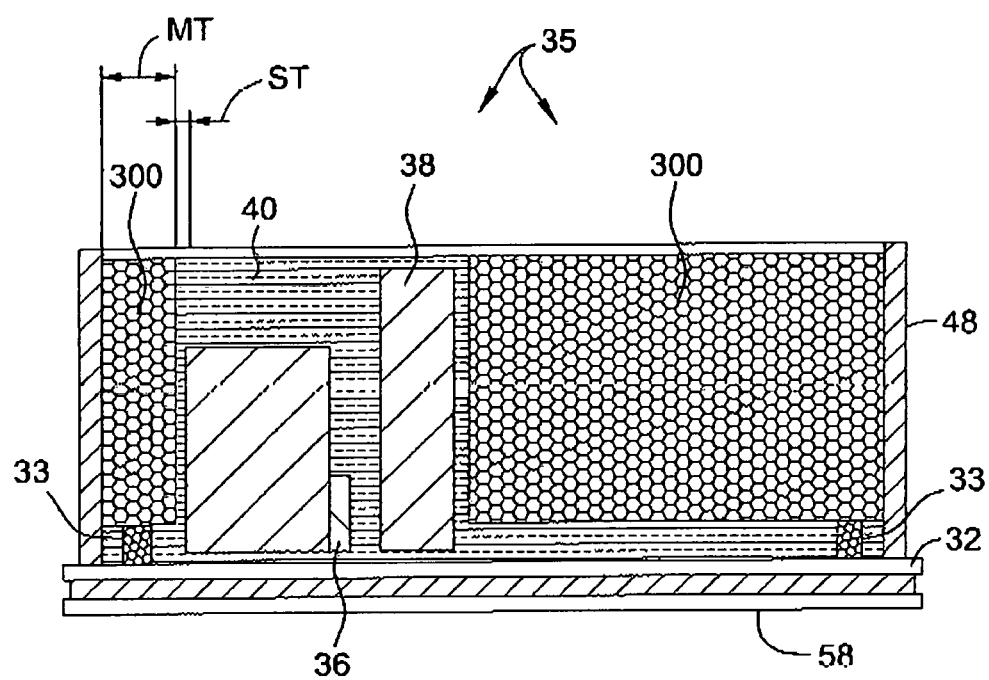
FIG. 16 is a partial cross sectional view of the electric machine of FIG. 1 with the potting plug of FIG. 14 installed into the machine.

According to another embodiment of the present invention and referring now to FIGS. 14-16, a plug 300 is provided. The plug 300 is adapted to be positioned at least partially within the potting cup 48 of FIGS. 2-8. The plug 300 may be adapted to displace a portion of the potting material 40 of FIGS. 2-8.

The plug may include a feature, for example risers 33 (see FIG. 16), to space the plug 300 above the circuit board 32 a distance to provide for a potting material height of the potting material 40 of for example MH (see FIG. 6). Alternately, the plug 300 may be positioned on a previously cured or in process potting material of proper potting material height.

The plug 300 includes openings 302 for receiving electrical component 35, for example large electrical components 38, for example bulk capacitors 39. The openings 302 are oversized with respect to the corresponding electrical component 35 to provide for a minimal plug clearance MPC or a safe plug clearance SPC to provide for a minimal potting material thickness MT or a safe potting material thickness ST. MT may be for example two (2) mm while ST may be for example three (3) mm.

As shown in FIG. 15, the plug 300 may have a lip 304 for positioning against the circuit board 32 and the cup 48 to provide for a minimal potting material thickness MT or a safe potting material thickness ST. The plug 300 may have a plug diameter PD at the circuit board 32 end to correspond to the cup 48. The plug 300 may have a height PHM to provide for filling the cup 48 with sufficient potting material 40 to provide for MH (see FIG. 6), a height PHS to provide for filling the cup 48 with sufficient potting material 40 to provide for example SH (see FIG. 6), or a height PHT to provide for filling the cup 48 with sufficient potting material 40 to provide for example TCH (see FIG. 6).

The plug 300 may be made of any material that is compatible with the potting material 40 and with the components of the control module 26. The plug 300 may be made of a polymer.

As shown in FIG. 16, the plug 300 serves to provide for potting material 40 around the electrical components 35 and around the circuit board 32, while substantially reducing the volume of expensive potting material required, thereby saving substantial material costs.

Figure 17:
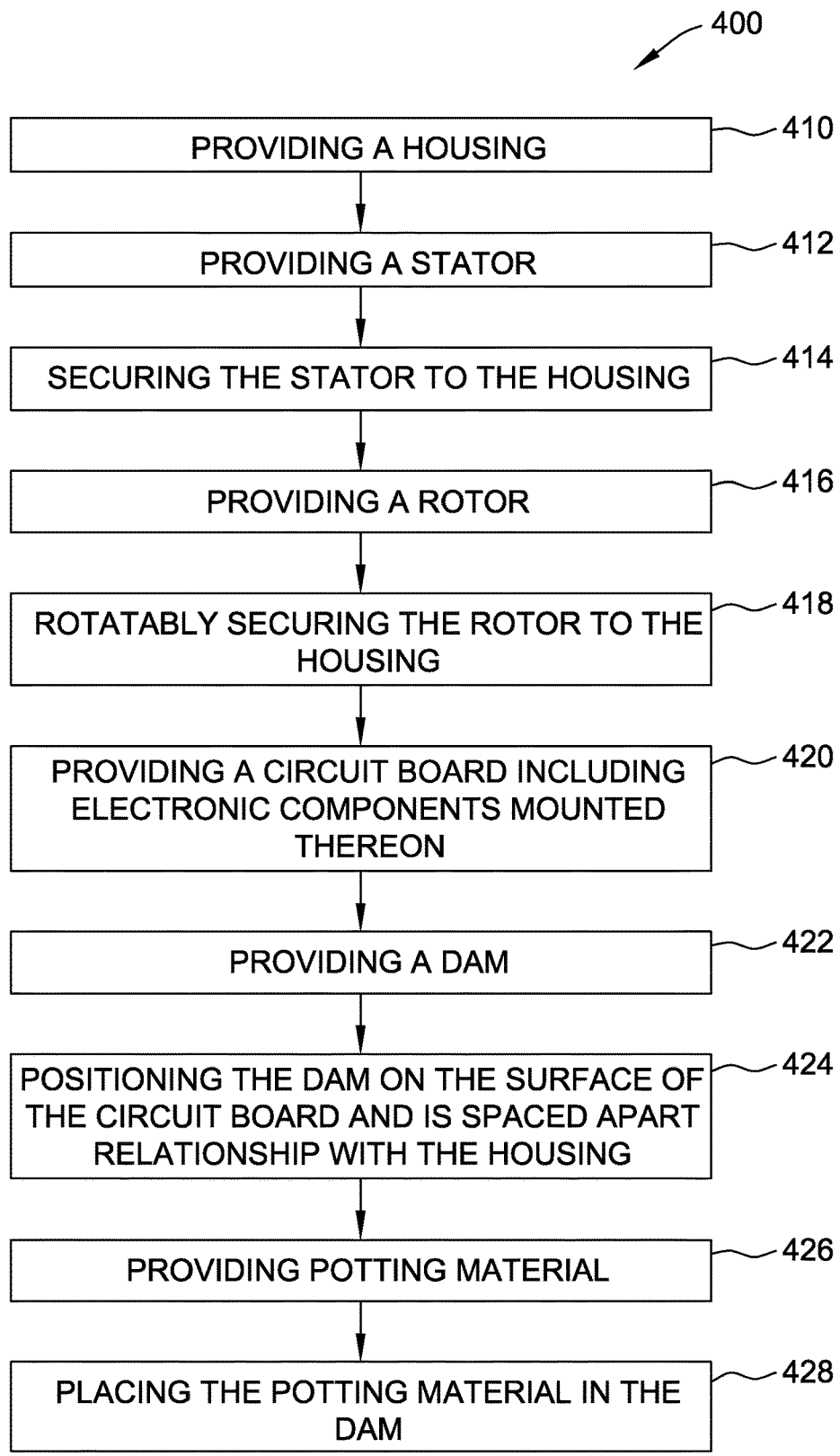
FIG. 17 is a flow chart of another embodiment of the present invention in the form of a method for providing an electric machine.

Referring now to FIG. 17, another embodiment of the present invention is shown as method 400 for protecting electronic components in an electrical machine. The method 400 includes the step 410 of providing a housing, the step 412 of providing a stator, and the step 414 of securing the stator to the housing. The method 400 also includes the step 416 of providing a rotor, the step 418 of rotatably securing the rotor to the housing, and the step 420 of providing a circuit board including electronic components mounted thereon. The method 400 also includes the step 422 of providing a dam and the step 424 of positioning the dam on a surface of the circuit board and in a spaced apart relationship with the housing. The method also includes the step 426 of providing potting material and the step 428 of placing the potting material in the dam.

The methods, systems, and apparatus described herein facilitate efficient and economical assembly of an electric, machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine, comprising:
   a housing;
   a stator secured to said housing;
   a rotor rotatably secured to said housing;
   a circuit board positioned at least partially within said housing, said circuit board controlling an electromagnetic field produced by said stator, said circuit board defining a first surface of said circuit board and having at least one electrical component mounted on the first surface of said circuit board;
   a barrier extending in a direction normal to the first surface of said circuit board, said circuit board and said barrier comprising a vessel to contain a potting material in a fluid form;
   a plug positioned at least partially within the barrier and configured to displace at least a portion of the fluid material in the vessel, said plug:
     having a wall and an interior portion therein, wherein at least one opening defined within the interior portion, the opening sized to receive a portion of the at least one electrical component, the at least one electrical component spaced from the interior wall; and
   potting material placed in the vessel between said first surface of said circuit board, said barrier and said plug.

2. The machine as in claim 1:
   wherein said housing defines an interior wall thereof; and
   wherein said barrier is spaced from said interior wall of said housing.

3. The machine as in claim 1, wherein said circuit board is positioned in said housing.

4. The machine as in claim 1, further comprising a second barrier for at least partially containing the potting material, said second barrier adjacent a second surface of said circuit board, the second surface opposed to the first surface of said circuit board, said second barrier engaging said first barrier.

5. The machine as in claim 4, wherein said potting material is placed on the second surface of said circuit board.

6. The machine as in claim 4, wherein said second barrier includes a generally planar portion thereof, the generally planar portion being adjacent the second surface of said circuit board.

7. An electric machine, comprising:
   a housing;
   a stator secured to said housing;
   a rotor rotatably secured to said housing;
   a circuit board positioned at least partially within said housing, said circuit board defining a first surface of said circuit board and having at least one electrical component mounted on the first surface of said circuit board;
   a barrier with extending in a direction normal to the first surface of said circuit board, said barrier and said circuit board containing the potting material and defining a fluid containing area;
   a plug positioned at least partially within the fluid containing area and spaced from the first surface of said circuit board and configured to displace at least a portion of the fluid material in the fluid containing area and having a wall and an interior portion therein, wherein at least one opening defined within the interior portion, the opening sized to receive a portion of the at least one electrical component, the at least one electrical component spaced from the interior wall; and
   potting material placed in the fluid containing area between said first surface of said circuit board, said barrier and said plug, said plug displacing a portion of said potting material.

8. The machine as in claim 7, wherein said plug further including a riser for spacing said plug from the first surface of said circuit board.

9. The machine as in claim 7, wherein said barrier is in contact with said circuit board.

10. The machine as in claim 7:
    wherein said housing defines an interior wall thereof; and
    wherein said barrier is spaced from said interior wall of said housing, said barrier comprising a wall extending vertically away from the first surface of said circuit board.

11. The machine as in claim 7, further comprising a second barrier for at least partially containing the potting material, said second barrier adjacent a second surface of said circuit board, the second surface opposed to the first surface of said circuit board, said second barrier engaging said first barrier.

12. The machine as in claim 11, wherein said second barrier includes a generally planar portion thereof, the generally planar portion being adjacent the second surface of said circuit board.

13. A plug fox use with an electric motor having a circuit board for holding at least one electrical component and utilizing potting material to encapsulate electrical component, said plug comprising:
    a body having a wall and an interior portion therein, wherein at least one opening defined within the interior portion, the opening sized to receive a portion of the at least one electrical component, the opening of said body sized to provide a space between the at least one electrical component and the wall of the body; and
    a riser extending from said body for spacing said plug from the circuit board, said body displacing a portion of the potting material.

14. The plug as in claim 13, wherein the riser has a height of 2 to 10 millimeters.

15. The machine as in claim 1, further comprising a plurality of spaced apart risers, each of the risers having a height of 2 to 10 millimeters.

16. The machine as in claim 1, wherein said barrier is in contact with said circuit board.

17. The machine as in claim 1, wherein said plug includes a riser for spacing said plug from the first surface of said circuit board.

* * * * *